222-95 SR
7/1/86 OR H 000,080

United States Statutory Invention Registration [19]

[11] Reg. Number: H80
[45] Published: Jul. 1, 1986

Lewis

[54] LIGHTWEIGHT CRYOGENIC TANK WITH POSITIVE EXPULSION

[75] Inventor: Joseph C. Lewis, Lacanada, Calif.

[73] Assignee: The United States of America as represented by the Secretary of the Air Force, Washington, D.C.

[21] Appl. No.: 630,148

[22] Filed: Jul. 12, 1984

[51] Int. Cl.[4] ..... B65D 35/22
[52] U.S. Cl. ..... 222/95; 222/386.5
[58] Field of Search ..... 222/95, 105, 386.5, 222/389

[56] References Cited

U.S. PATENT DOCUMENTS

| | | | |
|---|---|---|---|
| 3,122,000 | 2/1964 | Sirocky | 222/386.5 |
| 3,339,803 | 9/1967 | Wayne et al. | 222/95 |
| 3,404,813 | 10/1968 | Waxman | 222/386.5 |
| 3,471,349 | 10/1969 | Cohen et al. | 156/155 |
| 3,494,513 | 2/1970 | Bauer | 222/386.5 |
| 3,516,578 | 6/1970 | Grossman et al. | 222/386.5 |
| 3,930,375 | 1/1976 | Hofmann | 62/45 |
| 3,945,534 | 3/1976 | Ady | 222/105 |
| 4,101,045 | 7/1978 | Roberts et al. | 220/404 |
| 4,213,545 | 7/1980 | Thompson et al. | 222/386.5 |
| 4,216,881 | 8/1980 | Rosman | 222/94 |
| 4,437,590 | 3/1984 | La Bruna | 222/386.5 |

*Primary Examiner*—Harold J. Tudor
*Attorney, Agent, or Firm*—Donald J. Singer; Bobby D. Scearce

[57] ABSTRACT

A lightweight tank structure for the storage and controlled expulsion therefrom of a cryogenic liquid is described which comprises a first container including a flexible metallic bladder and defining an interior collapsible volume for containing the cryogenic liquid, a second high pressure container enclosing the first container, a third container enclosing the second container and including supports for maintaining the second container in a spaced relationship within the third container, a first tube operatively connected to the first container through which the cryogenic liquid may be inserted into the first container and controllably expelled therefrom, a source of pressurized gas, and a tube operatively interconnecting the second container and the gas source for controllably supplying pressurized gas to the interior of the second container whereby the contained cryogenic liquid may be controllably expelled by controlled collapsing of the bladder of the first container. Additional insulation in the form of a layer of foam on the exterior surface of the third container, and of a cryogenic coolant or a vacuum maintained in the space between the second and third containers may be included.

7 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

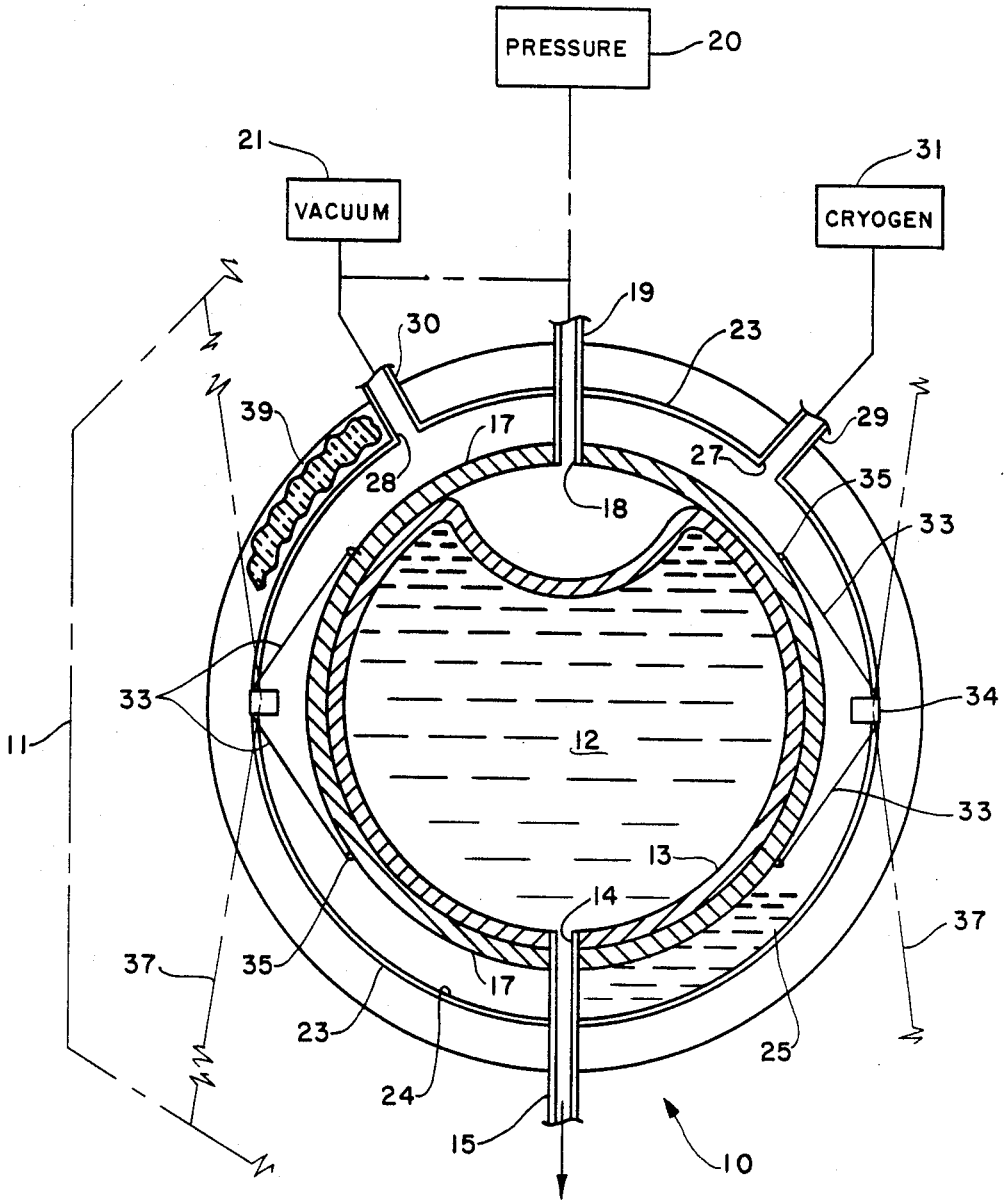
PRESSURE
20
21
VACUUM
31
CRYOGEN
19
30
23
39
17
29
27
28
35
18
33
33
34
11
12
33
13
14
37
37
35
17
23
25
24
15
10

LIGHTWEIGHT CRYOGENIC TANK WITH POSITIVE EXPULSION

RIGHTS OF THE GOVERNMENT

The invention described herein may be manufactured and used by or for the Government of the United States for all governmental purposes without the payment of any royalty.

BACKGROUND OF THE INVENTION

The present invention relates generally to improvements in cryogenic storage tanks, and more particularly to a novel tank structure for storage of a cryogenic liquid including means for controlled positive expulsion of the cryogenic liquid therefrom.

In low gravity or negative gravity fields, cryogenic liquids need positive expulsion for controlled flow from the vessels within which they are stored. Typical positive expulsion devices include rubber diaphragms or bladders or metallic bellows. Rubber and other elastomeric materials are not normally suitable for use in cryogenic storage vessel construction where they contact the very low temperatures characteristic of a cryogenic liquid, since they are embrittled at cryogenic temperatures and many are not compatible with such oxidizers as liquid fluorine or nitrogen trifluoride. Also, typical cryogenic storage tanks presently used aboard space-launched vehicles comprise heavy double-walled dewar-type vacuum vessels which require boil-off to relieve pressure and to maintain cooling. Existing tank structures including metallic bellows are likewise undesirably heavy.

The present invention provides a novel tank structure configured for storing a cryogenic liquid either for terrestrial operation or for use aboard a space vehicle and including means for the controlled positive expulsion of the contained cryogenic liquid in any gravity environment, including the influence of normal gravity, or a zero gravity environment, or the excessive g forces (positive or negative) that may be characteristic of an accelerating coordinate system of an operating spacecraft. The structure of the tank of the present invention comprises a thin metallic bladder providing primary containment for the cryogenic liquid. A high-pressure containment shell surrounds the bladder and is in turn enclosed within a thin metallic shell. The high-pressure containment shell is centered within the metallic shell in a spaced relationship by a plurality of struts or tension straps to define a space within which a cryogenic coolant may be maintained for primary insulative purposes. The outer surface of the metallic shell may be covered with a layer of foam to provide secondary insulation. A source of pressurized gas is operatively connected to the high pressure containment shell for controllably exerting gas pressure on the exterior surface of the bladder, and thereby controllably collapsing the bladder to provide controlled flow of the cryogenic liquid therefrom. As compared to existing tank structures, the cryogenic storage tank of the present invention minimizes the space occupied by a given volume of contained cryogenic liquid, minimizes any amount of cryogenic coolant which may be required as primary insulation, minimizes the amount of contained cryogenic liquid wasted as a result of boiloff, maximizes the strength of the tank structure, and minimizes any weight penalty associated with its inclusion within a vehicle.

It is, therefore, a principal object of the present invention to provide an improved tank for storing or transporting cryogenic liquids.

It is a further object of the invention to provide a cryogenic tank having positive expulsion capability for supplying a cryogenic liquid therefrom.

It is a further object of the invention to provide a cryogenic tank for supplying cryogenic liquids under zero or other abnormal gravity environments.

These and other objects of the present invention will become apparent as the detailed description of certain representative embodiments thereof proceeds.

SUMMARY OF THE INVENTION

In accordance with the foregoing principles and objects of the present invention, a lightweight tank structure for the storage and controlled expulsion therefrom of a cryogenic liquid is described which comprises a first container including a flexible metallic bladder and defining an interior collapsible volume for containing the cryogenic liquid, a second high pressure container enclosing the first container, a third container enclosing the second container and including supports for maintaining the second container in a spaced relationship within the third container, a first tube operatively connected to the first container through which the cryogenic liquid may be inserted into the first container and controllably expelled therefrom, a source of pressurized gas, and a tube operatively interconnecting the second container and the gas source for controllably supplying pressurized gas to the interior of the second container whereby the contained cryogenic liquid may be controllably expelled by controlled collapsing of the bladder of the first container. Additional insulation in the form of a layer of foam on the exterior surface of the third container, and of a cryogenic coolant or a vacuum maintained in the space between the second and third containers may be included.

DESCRIPTION OF THE DRAWINGS

The present invention will be more clearly understood from the following detailed description of certain representative embodiments thereof read in conjunction with the accompanying drawing which is a sectional view of a representative embodiment of the novel cryogenic tank of the present invention.

DETAILED DESCRIPTION

Referring now to the accompanying drawing, presented therein is a schematic cross-sectional view of a representative embodiment of the cryogenic storage tank 10 of the present invention. Although tank 10 may be suitable for use in both terrestrial or extraterrestrial environments, it is shown mounted within a spacecraft 11 (shown schematically as peripheral broken line) to best illustrate its structure and function in a working environment.

Tank 10 comprises a plurality of substantially concentric containment shells for providing liquid containment, high pressure containment, and thermal insulation, for a cryogenic liquid 12. As will be apparent to one with skill in the field of the present invention, tank 10 may be useful for the containment of cryogenic liquids 12 including liquid hydrogen, helium, oxygen, fluorine, nitrogen, nitrogen trifluoride, and other cryogenic liquids useful as coolants or propellants aboard a spacecraft.

The representative tank 10 shown in the drawing is illustrative of a spherical structure of one embodiment, although the structure herein defined is also applicable to alternative configurations, such as cylinders or other shapes typically used in tank construction. Accordingly, tank 10 may comprise a first container in the form of a thin walled shell comprising a flexible metallic expulsion bladder or diaphragm 13 defining a collapsible volume therein for providing primary containment and controlled positive expulsion of cryogenic liquid 12 as hereinbelow described. Bladder 13 may preferably comprise a metal selected from the group including aluminum and its alloys, steel, stainless steel, copper and its alloys, titanium and its alloys, nickel and nickel-based alloys, and cobalt and cobalt-based alloys; more specifically, for relatively non-reactive cryogenic liquids such as liquid helium, nitrogen, neon, argon, or the like, aluminum, titanium, or stainless steel may be preferred for bladder 13 construction; for reactive liquids such as hydrogen, fluorine, oxygen, etc., a bladder 13 of aluminum, titanium, nickel-based alloys, or stainless steel may be preferred, depending on the specific contained liquid. Wall thickness for bladder 13 is preferably in the range of from about 0.25 to about 3.0 mm, depending on metal selection therefor, in order to provide desirable flexibility to bladder 13. An inlet/outlet opening 14 may be defined in one side of bladder 13 to which an inlet/-outlet conduit or tube 15 may be operatively connected, extending through the surrounding tank 10 elements, and providing means through which cryogenic liquid 12 may be inserted into or discharged from tank 10 as hereinafter detailed, through means (not shown) attachable to tube 15.

Ordinarily, cryogenic tanks of the type comparable in size to the tank 10 illustrated in the drawing and used in space missions for containment of coolants or propellants may have a capacity of up to about five cubic meters. Bladder 13 may be sized accordingly with a practical upper limit in size of about fifty cubic meters.

Surrounding bladder 13 is a second container in the form of a shell 17 of suitable high strength material for providing high pressure containment for bladder 13 containing cryogenic liquid 12. Shell 17 may preferably comprise titanium, aluminum, stainless steel, nickel-based alloys, or other material of suitably high strength, and defining an interior volume of size and shape conforming to the size and outer surface shape of bladder 13 in the fully expanded condition. For the overall size contemplated for tank 10, shell 17 may have a wall thickness of up to about 5 cm, depending on the strength of the selected material, and may be assembled conventionally into the desired (spherical, cylindrical, etc.) shape by welding, forging, forming, or other well known processes.

An inlet/outlet opening 18 is defined in one side of shell 17 (preferably remote of the side through which tube 15 extends) for connection thereto of an inlet/outlet conduit or tube 19, in turn selectively connected to a source 20 of pressurized gas or to an evacuation means 21. Source 20 may preferably comprise a low boiling, relatively inert gas such as helium, argon, or nitrogen, and may include means for controllably imparting pressure external of bladder 13 within shell 17 in the operation of tank 10 as hereinafter described.

Surrounding shell 17 is a third container comprising a thin metallic shell 23 configured to define a space 24 therebetween for containing a primary insulative layer in the form of a vacuum or cryogenic coolant 25. For terrestrial applications of tank 10, space 24 may preferably be filled with a cryogenic coolant 25 such as liquid nitrogen, liquid helium, liquid argon, or like cryogens. For application aboard a spacecraft, space 24 may preferably be evacuated, such as by being open to space, in order to provide a suitable primary insulative layer around shell 17. Accordingly, one or more inlet/outlet openings 27,28 may be defined in shell 23 at which one or more inlet/outlet conduits or tubes 29,30 may be respectively connected to shell 23 in order to permit space 24 to be filled with a cryogenic coolant 25 from a source 31, or through which space 24 may be evacuated, such as through vacuum means 21 or by opening to an outer space environment. Metallic shell 23 may comprise any suitable containment material conventionally used for such purposes, such as aluminum, titanium, stainless steel, or nickel-based alloys, of from 0.1 to about 0.5 mm in thickness, and assembled using conventional techniques similar to that suggested above for the fabrication of shell 17.

Pressure containment shell 17 is preferably disposed concentric with metallic shell 23. Structural strength for centering shell 17 may be provided by tension straps 33 of suitable material (lightweight composite or other filament tension straps may be preferred) interconnecting a plurality of mounting rings or brackets 34 on shell 23 with a comparable plurality of eyelets or brackets 35 on the exterior surface of shell 17.

Structural support for tank 10 within the vehicle 11 in which it is carried may be provided conventionally through supporting tension straps, brackets, or struts 37.

An insulative layer 39 of foam insulation or the like may be provided around the entirety of the assembly as just described and illustrated in the drawing to provide secondary thermal insulation in the structure of the present invention. Insulative layer 39 may comprise any material conventionally used for such purpose, including polyurethane foam, polybenzimidol foam, or other suitable insulative foam; material selection is not critical to the invention herein so long as layer 39 is highly insulative. Ordinarily, layer 39 will be from about 2 to about 10 cm in thickness.

In the operation of tank 10, initial cooldown and filling of tank 10 may be accomplished by first evacuating space 24 and the interiors of high pressure containment shell 17 and bladder 13, and subsequently flushing with a low boiling inert gas to remove contaminating vapors which might condense, freeze, and obstruct one or more of the various inlet/outlet tubes of which tank 10 is comprised. Space 24 may then be filled with a cryogenic coolant 25 in order to cool down the interior of shell 17 and bladder 13. Cryogenic liquid 12 may then be inserted into bladder 13 through inlet/outlet tube 15 by conventional means, such as through a double concentric dip tube (not shown) insertable into tube 15, or by drawing a vacuum on the outer surface of previously partially evacuated and collapsed bladder 13 and thereby drawing cryogenic liquid 12 into the interior of bladder 13, or by other suitable means. Cryogenic liquid 12 may then be supplied when needed from tank 10 by controllably supplying gas pressure from source 20 to the interior of shell 17 through inlet/outlet tube 19. The pressure thereby imparted acts on the exterior surface of bladder 13, initially in a substantially fully expanded condition, and causes bladder 13 to collapse as suggested in the drawing. The controlled collapsing results in a controllable flow of cryogenic liquid 12 from tank 10.

Tank 10 as just described in one representative embodiment therefor provides a rapid, positive expulsion of a cryogenic liquid 12 which may be operable in a gravity field characteristic of terrestrial operation, a high negative gravity field, or under the zero gravity field characteristic of extraterrestrial spacecraft based operation. As compared to existing cryogenic tank configurations, the structure of the tank of the present invention minimizes the space occuppied by the cryogenic liquid 12 carried within a vehicle 11, and thereby minimizes any amount of cryogenic coolant (25 in the drawing) required as primary coolant, minimizes the amount of cryogenic liquid 12 wasted as a result of boiloff, maximizes the strength of the tank structure, and minimizes any weight penalty associated with its inclusion within a vehicle 11.

The present invention, as hereinabove described, therefore provides a novel cryogenic storage tank having positive expulsion. It is understood that certain modifications to the invention as described may be made, as might occur to one with skill in the field of this invention, within the scope of the appended claims. Therefore, all embodiments contemplated hereunder which achieve the objectives of the invention have not been shown in complete detail. Other embodiments may be developed without departing from the spirit of this invention or from the scope of the appended claims.

I claim:

1. A tank structure for the storage and controlled expulsion therefrom of a cryogenic liquid, comprising:

(a) a first container in the form of a flexible metallic bladder having a wall thickness of from about 0.25 to about 3.0 millimeters defining an interior collapsible volume of predetermined size in a fully expanded condition for containing said liquid said bladder being substantially totally collapsible within itself upon expulsion of said liquid;

(b) a second container surrounding and providing the sole structural support for said first container and defining an interior volume of size and shape conforming substantially to that of said first container in said fully expanded condition;

(c) a third container surrounding said second container;

(d) a plurality of struts connected between the outer surface of said second container and the inner surface of said third container for supporting said second container within said third container in a spaced relationship to said third container;

(e) first fluid conducting conduit means operatively connected to said first container, communicating with said collapsible volume, and extending outwardly through said second and third containers, through which said cryogenic liquid may be inserted into said first container and conducted therefrom;

(f) a source of pressurized gas; and (g) second fluid conducting conduit means operatively interconnecting said second container and said source, for controllably supplying said gas to the interior of said second container.

2. The tank structure as recited in claim 1 further comprising a layer of foam insulation on the exterior surface of said third container.

3. The tank structure as recited in claim 2 wherein said foam is selected from the group consisting of polyurethane foam and polybenzimidol foam.

4. The tank structure as recited in claim 1 further comprising a cryogenic coolant within the space defined between said second and third containers for providing insulation to said second container.

5. The tank structure as recited in claim 4 wherein said cryogenic coolant is selected from the group consisting of liquid nitrogen, liquid argon, liquid helium, and liguid hydrogen.

6. The tank structure as recited in claim 1 further comprising means, connected to said third container for selectively evacuating the space defined between said second and third containers.

7. The tank structure as recited in claim 1 wherein said flexible bladder comprises a metal selected from the group consisting of aluminum, titanium, steel, stainless steel, nickel, cobalt, and copper.

* * * * *